US012615430B2

(12) United States Patent
Takatsuka et al.

(10) Patent No.: US 12,615,430 B2
(45) Date of Patent: Apr. 28, 2026

(54) NEURAL NETWORK DEVICE AND CONTROL METHOD

(71) Applicant: SONY GROUP CORPORATION, Tokyo (JP)

(72) Inventors: Susumu Takatsuka, Tokyo (JP); Kenta Endo, Tokyo (JP); Christopher Wright, Lausanne (CH); Bernadette Elliott-Bowman, Lausanne (CH); Nicholas Walker, Lausanne (CH)

(73) Assignee: SONY GROUP CORPORATION, Tokyo (JP)

( * ) Notice: Subject to any disclaimer, the term of this patent is extended or adjusted under 35 U.S.C. 154(b) by 62 days.

(21) Appl. No.: 18/700,741

(22) PCT Filed: Oct. 14, 2022

(86) PCT No.: PCT/JP2022/038415
§ 371 (c)(1),
(2) Date: Apr. 12, 2024

(87) PCT Pub. No.: WO2023/074414
PCT Pub. Date: May 4, 2023

(65) Prior Publication Data
US 2024/0414428 A1     Dec. 12, 2024

(30) Foreign Application Priority Data

Oct. 25, 2021     (JP) ................................. 2021-174086

(51) Int. Cl.
| | |
|---|---|
| *H04N 23/61* | (2023.01) |
| *G06N 3/0464* | (2023.01) |
| *G06N 3/067* | (2006.01) |
| *H04N 23/11* | (2023.01) |

(52) U.S. Cl.
CPC .......... *H04N 23/61* (2023.01); *G06N 3/0464* (2023.01); *G06N 3/067* (2013.01); *H04N 23/11* (2023.01)

(58) Field of Classification Search
CPC ...... H04N 23/61; H04N 23/11; G06N 3/0464; G06N 3/067; G06N 3/0675
See application file for complete search history.

(56) References Cited

U.S. PATENT DOCUMENTS

| | | | |
|---|---|---|---|
| 2009/0046157 A1* | 2/2009 | Cilia ................... | H04N 5/2627 |
| | | | 348/347 |
| 2019/0043327 A1* | 2/2019 | Stent ...................... | H04N 23/90 |
| 2021/0012184 A1* | 1/2021 | Rodrigues ............. | G01S 7/4816 |

FOREIGN PATENT DOCUMENTS

| | | |
|---|---|---|
| JP | 2021-036420 A | 3/2021 |
| JP | 2021-162917 A | 10/2021 |

OTHER PUBLICATIONS

International Search Report and Written Opinion of PCT Application No. PCT/JP2022/038415, issued on Jan. 17, 2023, 09 pages of ISRWO.
Chen, et al., "Diffractive Deep Neural Networks at Visible Wavelengths", Engineering, Feb. 13, 2021, pp. 1483-1491.

* cited by examiner

*Primary Examiner* — Timothy J Henn
(74) *Attorney, Agent, or Firm* — CHIP LAW GROUP

(57) ABSTRACT
A neural network device includes a light receiving portion that receives light through an optical neural network, and a control unit that performs a predetermined control with detection of a predetermined target object based on a signal corresponding to light received by the light receiving portion as a trigger.

14 Claims, 16 Drawing Sheets

NEURAL NETWORK DEVICE AND CONTROL METHOD

CROSS REFERENCE TO RELATED APPLICATIONS

This application is a U.S. National Phase of International Patent Application No. PCT/JP2022/038415 filed on Oct. 14, 2022, which claims priority benefit of Japanese Patent Application No. JP 2021-174086 filed in the Japan Patent Office on Oct. 25, 2021. Each of the above-referenced applications is hereby incorporated herein by reference in its entirety.

TECHNICAL FIELD

The present technology relates to a neural network device, a control method, and a program, and particularly relates to a technology using an optical neural network.

BACKGROUND ART

Conventionally, there has been proposed a neural network device that constructs a neural network including a plurality of intermediate layers between an input layer and an output layer, learns parameters using this neural network, and outputs a score to input information (refer to, for example, Patent Document 1).

CITATION LIST

Patent Document

Patent Document 1: Japanese Patent Application Laid-Open No. 2021-162917

SUMMARY OF THE INVENTION

Problems to be Solved by the Invention

However, in the above-described neural network device, the load of processing by the neural network tends to be increased, and the power consumption is increased accordingly. Therefore, there has been a possibility that the power consumption is increased to perform a predetermined control on the basis of a result of processing by the neural network.

Therefore, an object of the present technology is to start the execution of a predetermined control with small power consumption.

Solutions to Problems

A neural network device according to the present technology includes a light receiving portion that receives light through an optical neural network, and a control unit that performs a predetermined control with detection of a predetermined target object based on a signal corresponding to light received by the light receiving portion as a trigger.

Therefore, before performing the predetermined control, the neural network device is able to operate the optical neural network operating with low energy and stop a device to be controlled.

BRIEF DESCRIPTION OF DRAWINGS

FIG. 5 is a diagram for explaining a configuration of a neural network device as a second embodiment.

MODE FOR CARRYING OUT THE INVENTION

Hereinafter, embodiments will be described in the following order.

<1. First embodiment>
<2. Second embodiment>
<3. Third embodiment>
<4. Fourth embodiment>
<5. Configuration examples of neural network device>
<6. Summary of embodiments>
<7. Present technology>

1. First Embodiment

Figure 1:
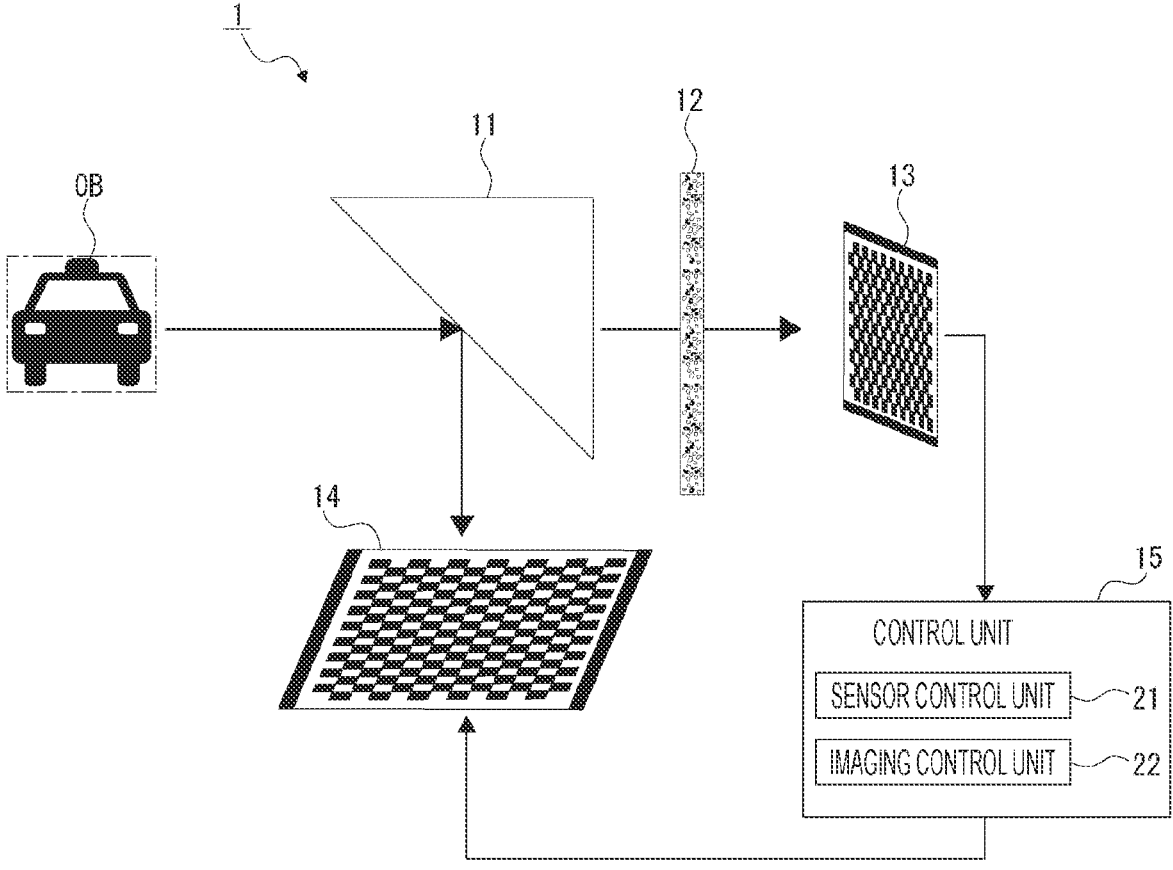
FIG. 1 is a diagram for explaining a configuration of a neural network device as a first embodiment.

FIG. 1 is a diagram for explaining a configuration of a neural network device 1 as a first embodiment. The neural network device 1 is a device that performs control with detection of a target object based on a signal received through an optical neural network (hereinafter, referred to as ONN) as a trigger.

Here, the ONN is a neural network formed by an optical circuit, and includes, for example, an optical diffractive deep neural network (hereinafter, referred to as ODDNN) and an optical convolutional neural network (OCNN). In the first embodiment, a case where the ODDNN is applied as the ONN will be described.

As illustrated in FIG. 1, the neural network device 1 includes a half mirror 11, an ODDNN 12, a light receiving portion 13, an imaging element 14, and a control unit 15.

In the neural network device 1, light from the outside enters the half mirror 11. The half mirror 11 transmits and reflects incident light (here, light reflected by an object OB) at a certain rate, and guides the transmitted light to the ODDNN 12 and guides the reflected light to the imaging element 14, for example.

The ODDNN 12 is formed by a translucent thin flat glass layer in which a large number of heterogeneous phases such as sub-wavelength-sized bubbles and graphene are arranged. Note that, although FIG. 1 illustrates a case where the ODDNN 12 is formed by one flat glass layer, the ODDNN 12 may be formed by a plurality of flat glass layers spaced therebetween at predetermined intervals.

Figure 2:
FIG. 2 is a diagram for explaining an optical circuit in an ODDNN.
Figure 2:
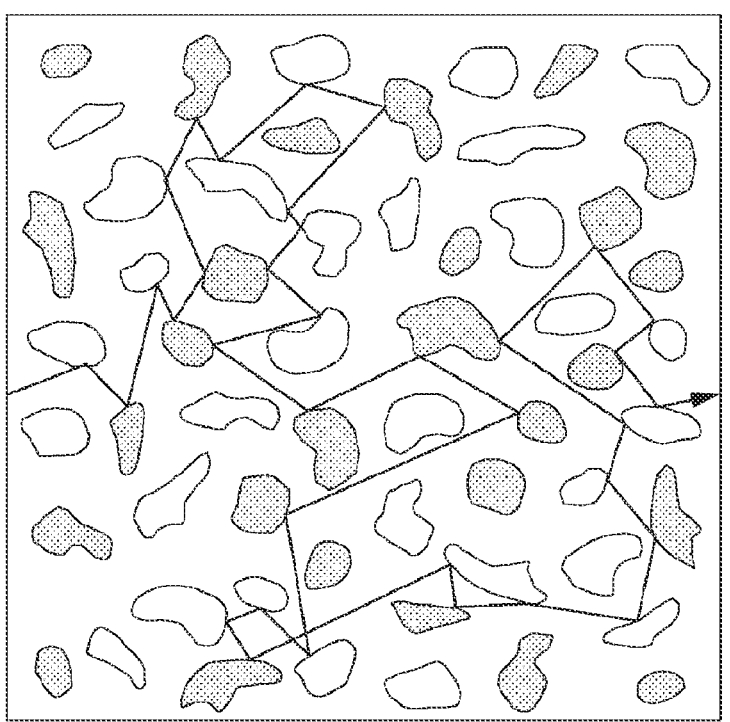
Figure 3:
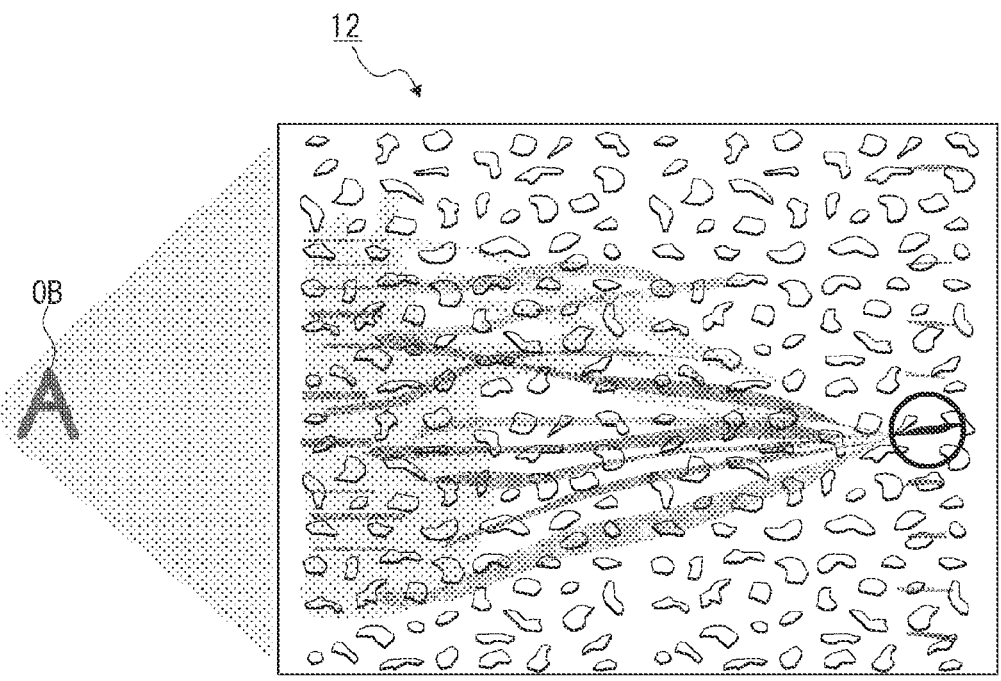
FIG. 3 is a diagram for explaining light emitted from the ODDNN.

FIG. 2 is a diagram for explaining an optical circuit in the ODDNN 12. FIG. 3 is a diagram for explaining light emitted from the ODDNN 12. FIG. 2 illustrates an example in which light enters from an incident surface on the left side in the drawing and is emitted from an emission surface on the right side in the drawing.

As illustrated in FIG. 2, in the ODDNN 12, light enters from the incident surface, and the incident light is repeatedly reflected, diffracted, and absorbed by heterogeneous phases mixed inside before being emitted from the emission surface. Here, in the ODDNN 12, there is generated a region on the emission surface where certain light is concentrated, in accordance with the incident light.

For example, as illustrated in FIG. 3, when light of the number "A" as an object OB enters, the light is most concentrated in a region surrounded by a black circle in the drawing on the emission surface of the ODDNN 12.

In this manner, in the ODDNN 12, the region where light is concentrated on the emission surface side is different for each incident light, that is, light reflected by the object OB to be incident (also simply referred to as light of the object OB). In other words, in the ODDNN 12, the intensity distribution of the light emitted from the emission surface is different for each incident light of the object OB.

Then, in the ODDNN 12, light corresponding to one or a plurality of objects OB is made to enter in advance so as to preliminarily learn the light intensity distribution on the emission surface. Therefore, when light of an unknown object OB has entered, the neural network device 1 is able to detect the learned object OB as a target object on the basis of the intensity distribution of the light emitted from the emission surface of the ODDNN 12 and the learning result.

In this manner, the ODDNN 12 functions as a neural network, but does not require then a power supply, an electronic circuit, a sensor, or the like. This enables an energy-saving and low load neural network to be constructed.

Furthermore, the ODDNN 12 is able to operate at a level of light velocity because the incident light is emitted after repeating reflection, diffraction, and absorption.

The light receiving portion 13 is arranged to face the emission surface of the ODDNN 12. The light receiving portion 13 is formed by a plurality of light receiving elements (for example, diodes) two-dimensionally arranged so as to detect light emitted from the emission surface of the ODDNN 12 in each predetermined range. Then, the light receiving portion 13 outputs a signal in accordance with the intensity of light received by each light receiving element to the control unit 15.

However, it is sufficient if the light receiving portion 13 has a resolution capable of detecting a target object on the basis of the light emitted from the emission surface of the ODDNN 12, and the light receiving portion 13 is formed by a significantly smaller number of light receiving elements than the number of pixels of the imaging element 14. Therefore, the light receiving portion 13 is able to operate with less energy than the imaging element 14.

The imaging element 14 is, for example, a charge coupled device (CCD) or complementary metal-oxide-semiconductor (CMOS) image sensor, and a plurality of pixels including photoelectric conversion elements is two-dimensionally arranged. The imaging element 14 captures an image of a predetermined imaging range through the half mirror 11 at certain intervals according to a frame rate to generate image data. Note that the image captured by the imaging element 14 may be either a still image or a moving image, or may be an image captured by interval imaging, or the like.

The control unit 15 includes, for example, a microcomputer including a central processing unit (CPU), a read only memory (ROM), and a random access memory (RAM), and performs overall control of the neural network device 1. The control unit 15 functions as a sensor control unit 21 and an imaging control unit 22 in the first embodiment.

The sensor control unit 21 detects a predetermined target object using the learning result of preliminary learning, on the basis of a signal input from the light receiving portion 13, that is, the light intensity distribution on the emission surface of the ODDNN 12. The imaging control unit 22 causes the imaging element 14 to start imaging with detection of the predetermined target object as a trigger.

Furthermore, the sensor control unit 21 detects and sets, as a region of interest (ROI), a range in which the target object has been detected on the basis of the signal input from the light receiving portion 13. Then, the imaging control unit 22 causes the imaging element 14 to perform an imaging operation targeting only the ROI.

Here, in the ODDNN 12, as described above, it is possible to detect a target object on the basis of the light intensity distribution on the emission surface. Furthermore, in the ODDNN 12, it is possible to detect an approximate position of a target object on the basis of the light intensity distribution on the emission surface. Therefore, in the neural network device 1, light of each of the target objects at different positions is made to enter the ODDNN 12 so as to preliminarily learn the light intensity distribution on the emission surface. Note that the learning result is stored in the ROM or the RAM of the control unit 15. Then, the sensor control unit 21 detects an ROI of the target object on the basis of the signal input from the light receiving portion 13 and the learning result.

Thereafter, in a case where the target object is imaged by the imaging element 14, the imaging control unit 22 performs predetermined image analysis on the target object and calculates an ROI of the target object. Then, even at and after the next frame, the imaging control unit 22 performs image analysis on the captured image of the ROI calculated in the previous frame, performs target object recognition processing, and calculates an ROI for the recognized target object. Note that a known analysis method can be used for the image analysis for setting an ROI, and thus the description thereof is omitted here.

With such a method, imaging by the imaging element 14 is started with detection of a predetermined target object as a trigger. Thus, only the light receiving portion 13 consuming lower power than the imaging element 14 needs to be operated until the predetermined target object is detected, which saves energy.

Figure 4:
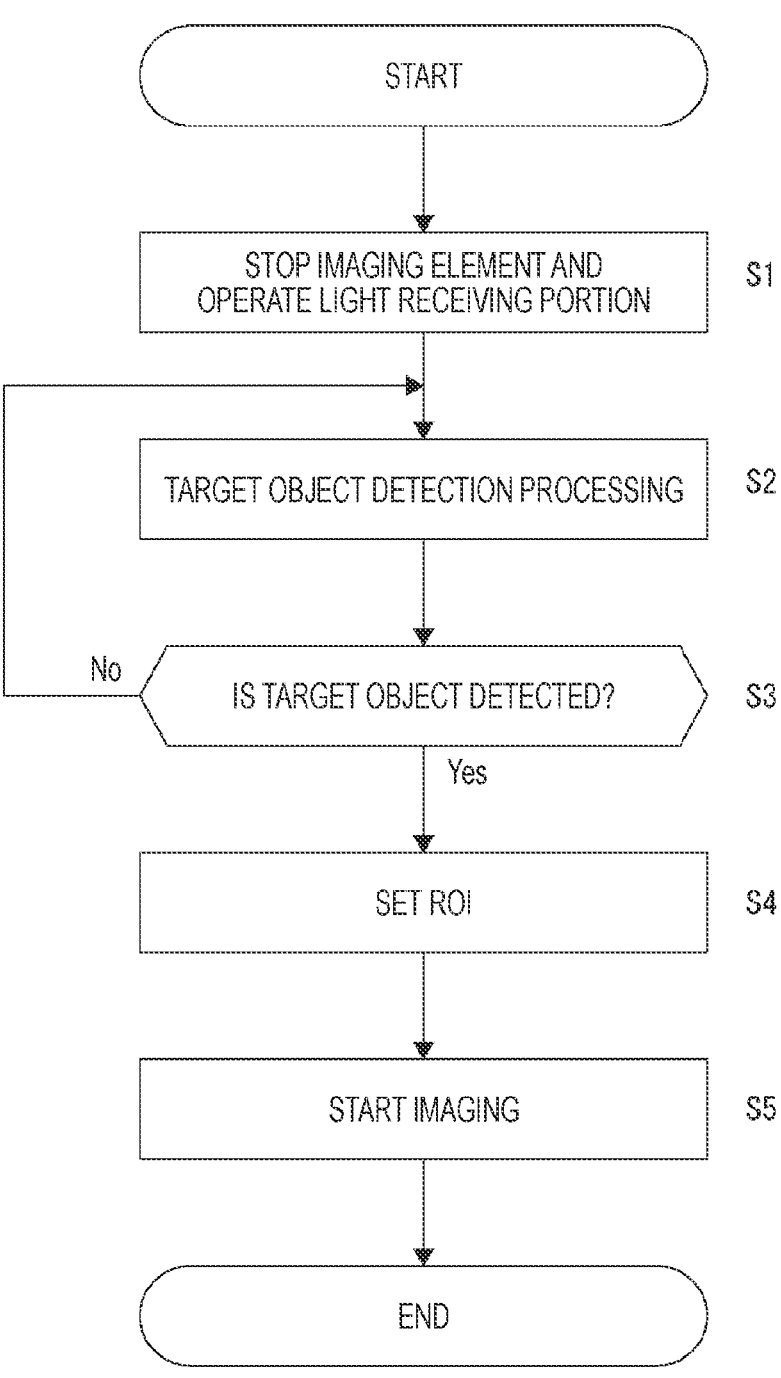
FIG. 4 is a flowchart showing a procedure of imaging processing.

FIG. 4 is a flowchart showing a procedure of imaging processing. As illustrated in FIG. 4, at step S1, the imaging control unit 22 stops the imaging element 14, and the sensor control unit 21 starts operation of the light receiving portion 13. At the subsequent step S2, the sensor control unit 21 performs target object detection processing of detecting a target object on the basis of a signal input from the light receiving portion 13. Here, it is determined whether a target object is detected using the learning result of preliminary learning, on the basis of the signal input from the light receiving portion 13, that is, the light intensity distribution on the emission surface of the ODDNN 12.

Then, at step S3, the sensor control unit 21 determines whether the predetermined target object is detected at step S2. If the predetermined target object is not detected (No at step S3), the sensor control unit 21 repeats the processing of steps S2 and S3.

Meanwhile, if the predetermined target object is detected (Yes at step S3), at step S4, the imaging control unit 22 sets, as an ROI, a range in which the predetermined target object has been detected on the basis of the signal input from the light receiving portion 13.

Thereafter, at step S5, the imaging control unit 22 causes the imaging element 14 to start imaging targeting only the ROI set at step S4.

2. Second Embodiment

Figure 5:
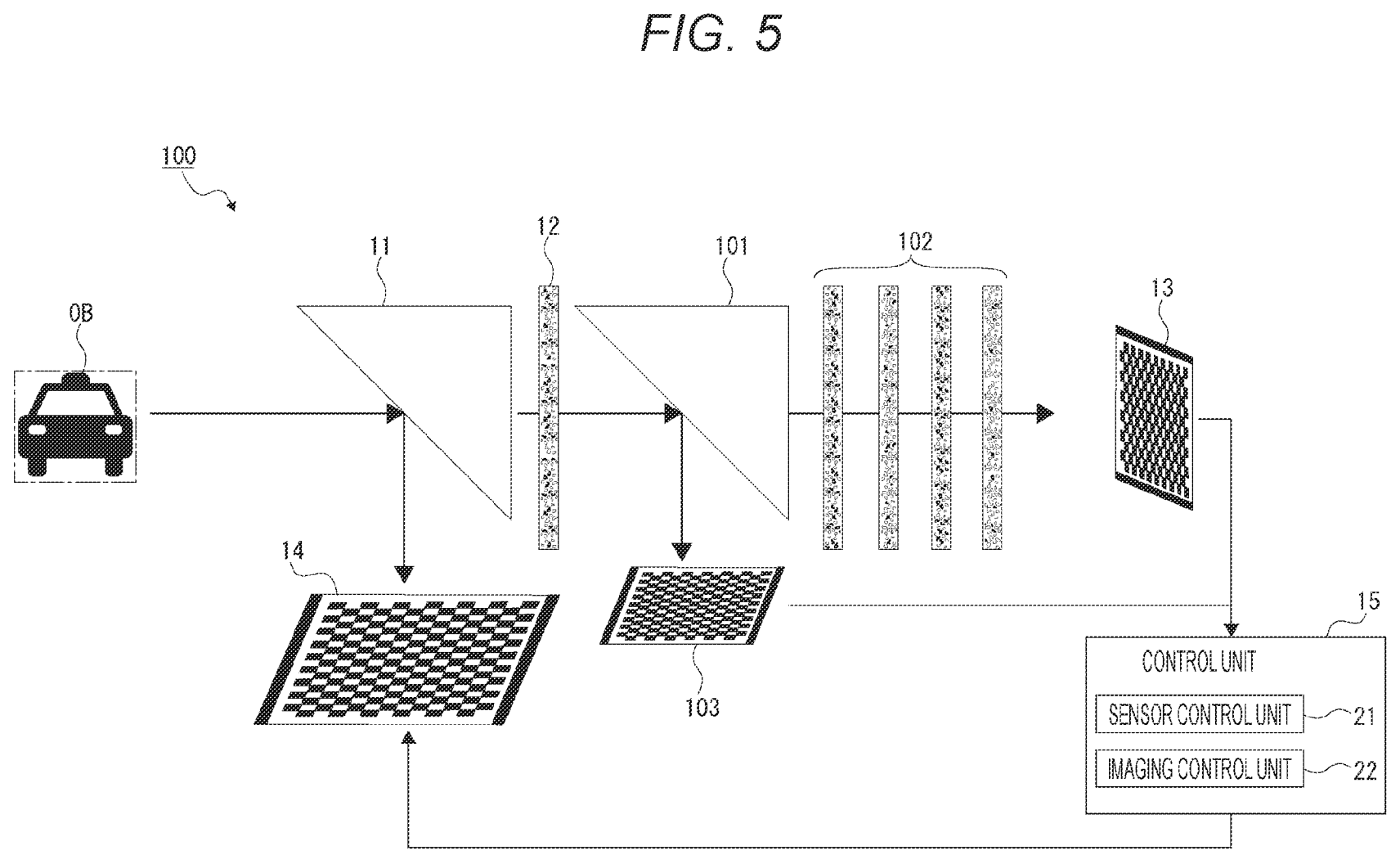

FIG. 5 is a diagram for explaining a configuration of a neural network device 100 as a second embodiment. Note that in the second embodiment, configurations different from those of the first embodiment will be described in detail, and the same configurations are denoted by the same reference signs, and the description thereof is omitted.

As illustrated in FIG. 5, the neural network device 100 includes a half mirror 101, an ODDNN 102, and a light receiving portion 103, in addition to the half mirror 11, the ODDNN 12, the light receiving portion 13, the imaging element 14, and the control unit 15.

In the neural network device 100, the half mirror 101 and the ODDNN 102 are disposed between the ODDNN 12 and the light receiving portion 13.

The light emitted from the ODDNN 12 enters the half mirror 101. The half mirror 101 transmits and reflects incident light at a certain rate, and guides the transmitted light to the ODDNN 102 and guides the reflected light to the light receiving portion 103, for example.

The ODDNN 102 is formed by a translucent thin flat glass layer in which a large number of heterogeneous phases such as sub-wavelength-sized bubbles and graphene are arranged, in a manner similar to the ODDNN 12. Furthermore, the ODDNN 102 includes one or more ODDNNs, and four ODDNNs 102 are provided in the example of FIG. 5.

Because the light emitted from the output surface of the ODDNN 12 enters the ODDNN 102, the light intensity distribution of a target object is learned in a state where the light emitted from the output surface of the ODDNN 12 has entered the ODDNN 102.

The ODDNN 12 and the ODDNN 102 are formed such that their detectable target objects are different from each other. Furthermore, in a case where a plurality of ODDNNs 102 is provided, the plurality of ODDNNs 102 may be formed such that their detectable target objects are different from each other, or may be formed such that the plurality of ODDNNs 102 can detect one target portion.

For example, the ODDNN 12 is formed to be able to detect a more general target object, as compared with the ODDNN 102. Specifically, the ODDNN 12 is formed to be able to detect a vehicle including an automobile, a truck, a motorcycle, and a bicycle. Meanwhile, the ODDNN 102 is configured to be able to detect a detailed target object such as an automobile, a truck, a motorcycle, and a bicycle.

The light receiving portion 103 is formed by a plurality of light receiving elements (for example, diodes) two-dimensionally arranged so as to detect light emitted from the emission surface of the ODDNN 12 in each predetermined range. Then, the light receiving portion 103 outputs a signal in accordance with the intensity of the light received by each light receiving element to the control unit 15.

The control unit 15 includes, for example, a microcomputer including a CPU, a ROM, and a RAM, and performs overall control of the neural network device 100. The control unit 15 functions as a sensor control unit 21 and an imaging control unit 22 in the second embodiment.

The sensor control unit 21 detects a predetermined target object using the learning result of preliminary learning, on the basis of a signal input from the light receiving portion 13, that is, the light intensity distribution on the emission surface of the ODDNN 102. Therefore, it is determined here whether a detailed target object (an automobile, for example) has been detected. The imaging control unit 22 causes the imaging element 14 to start imaging with detection of the predetermined target object as a trigger.

Furthermore, the sensor control unit 21 detects and sets, as an ROI, a range in which a general target object (a vehicle, for example) has been detected on the basis of a signal input from the light receiving portion 103. Then, the imaging control unit 22 causes the imaging element 14 to perform an imaging operation targeting only the ROI.

Thereafter, in a case where the target object is imaged by the imaging element 14, the imaging control unit 22 performs predetermined image analysis on the target object and calculates an ROI of the target object. Then, even at and after the next frame, the imaging control unit 22 performs image analysis on the captured image of the ROI calculated in the previous frame, performs target object recognition processing, and calculates an ROI for the recognized target object.

With such a method, a target object to be a target for a trigger and a target object to be a target for ROI can be made different in the neural network device 100. Thus, it is also possible to perform imaging focusing on a range that is not necessarily a target object to be a target for a trigger.

Furthermore, the neural network device 100 is also able to perform imaging focusing on a target object (another vehicle) other than a target object (automobile) to be a target for a trigger.

Moreover, in the neural network device 100, imaging by the imaging element 14 is started with detection of a predetermined target object as a trigger. Thus, only the light receiving portions 13, 103 having lower power consumption than the imaging element 14 need to be operated until the predetermined target object is detected, which can save energy.

Note that the imaging processing in the second embodiment is the same as that in the first embodiment, and thus the description thereof will be omitted.

3. Third Embodiment

Figure 6:
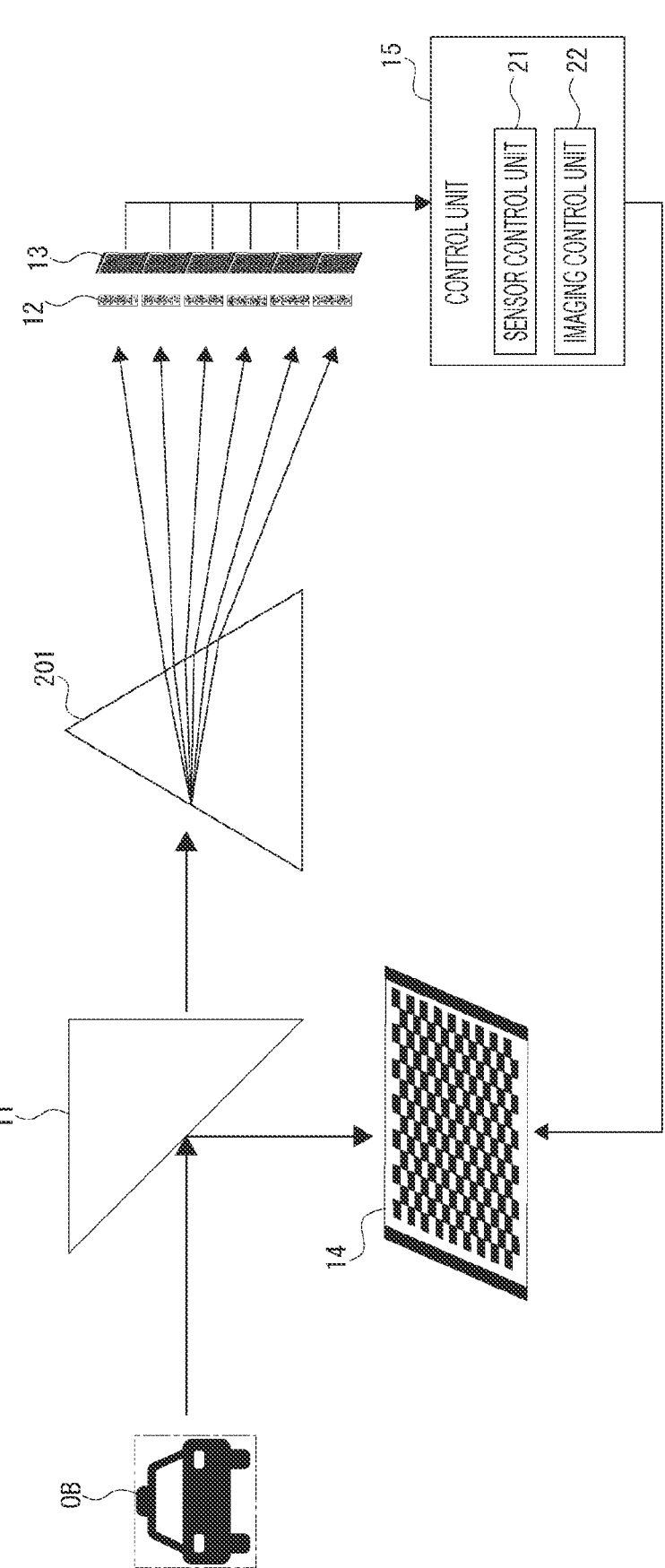
FIG. 6 is a diagram for explaining a configuration of a neural network device as a third embodiment.

FIG. 6 is a diagram for explaining a configuration of a neural network device 200 as a third embodiment. Note that in the third embodiment, configurations different from those of the first embodiment will be described in detail, and the same configurations are denoted by the same reference signs, and the description thereof is omitted.

As illustrated in FIG. 6, the neural network device 200 includes a spectroscopic portion 201, in addition to the half mirror 11, the ODDNN 12, the light receiving portion 13, the imaging element 14, and the control unit 15.

In the neural network device 200, light from the outside enters the half mirror 11. The half mirror 11 guides the transmitted light to the spectroscopic portion 201 and guides the reflected light to the imaging element 14.

The spectroscopic portion 201 is a device that disperses incident light, and is a prism in the third embodiment. The spectroscopic portion 201 disperses the incident light using a difference in refractive index for each wavelength. The dispersed light is incident on the ODDNN 12.

Figure 7:
FIG. 7 is an enlarged view of a spectroscopic portion, an ODDNN, and a light receiving portion.

FIG. 7 is an enlarged view of the spectroscopic portion 201, the ODDNN 12, and the light receiving portion 13. Here, in a case where light of different wavelength regions has entered one ODDNN 12, crosstalk due to light of different wavelength regions may occur in the ODDNN 12, thereby deteriorating the accuracy of target object detection.

Therefore, in the third embodiment, the ODDNN 12 includes a plurality of (six in FIG. 7) ODDNNs. Specifically, light of different wavelength regions (light of first to sixth wavelength regions, for example) enters a plurality of ODD-NNs 12*a* to 12*f*, respectively.

Here, the plurality of ODDNNs 12*a* to 12*f* is each selected to be optimal for the light of a wavelength region to be incident thereon. Here, the "to be optimal" indicates adjustment of the arrangement of heterogeneous phases in the flat glass layer, the number of flat glass layers, and the interval between the flat glass layers so that the accuracy of target object detection based on light of a wavelength region to be incident is higher than the case based on light of another wavelength region.

For example, the ODDNN 12*a* optimized for light of the first wavelength region is arranged such that light of the first wavelength region is incident thereon. In a similar manner, the ODDNNs 12*b* to 12*f* optimized for light of the second wavelength region to the sixth wavelength region, respectively, are arranged such that light of the second wavelength region to the sixth wave length region is incident thereon, respectively. Therefore, in the ODDNNs 12*a* to 12*f*, it is possible to reduce the influence of crosstalk due to incidence of light of different wavelength regions, and further improve the accuracy of target object detection.

Then, in the neural network device 200, the ODDNNs 12*a* to 12*f* have received light of respective target objects mainly reflecting light of corresponding wavelength regions so as to preliminarily learn the light intensity distribution regions on the emission surfaces. Note that the learning result is stored in the ROM or the RAM of the control unit 15.

The same number of light receiving portions 13 as the ODDNNs 12 are provided, and are arranged to face the emission surfaces of the ODDNNs 12. That is, a light receiving portion 13*a* is arranged to face the emission surface of the ODDNN 12*a*. In a similar manner, light receiving portions 13*b* to 13*f* are arranged to face the emission surfaces of the ODDNN 12*b* to ODDNN 12*f*, respectively. The light emitted from the ODDNNs 12*a* to 12*f* is guided to the corresponding light receiving portions 13*a* to 13*f*.

The control unit 15 functions as a sensor control unit 21 and an imaging control unit 22 in the third embodiment.

The sensor control unit 21 detects a predetermined target object using the learning result of preliminary learning, on the basis of a signal input from the light receiving portion 13, that is, the light intensity distribution on the emission surface of the ODDNN 12.

Figure 8:
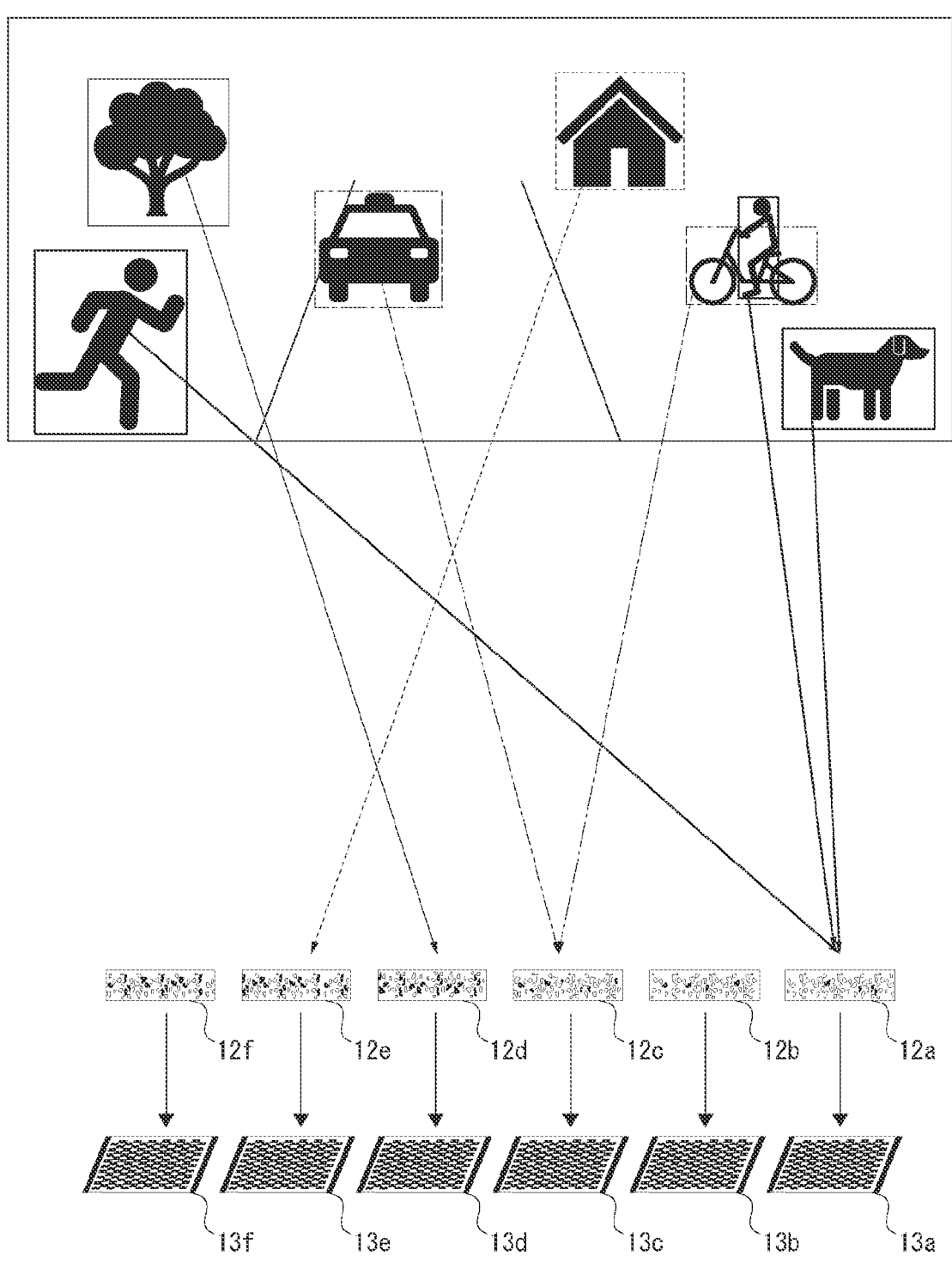
FIG. 8 is a diagram for explaining a specific example of target object detection.

FIG. 8 is a diagram for explaining a specific example of target object detection. As illustrated in FIG. 8, it is assumed that a person, a tree, an automobile, a house, a dog, and a bicycle are set as the target objects. In such a case, for example, the person and the dog mainly reflect light of the first wavelength region. The automobile and the bicycle mainly reflect light of the third wavelength region. The tree mainly reflects light of the fourth wavelength region. The house mainly reflects light of the fifth wavelength region.

Therefore, for example, in a case where an automobile is a target object, the sensor control unit 21 detects an automobile on the basis of a signal input from the light receiving portion 13*a* corresponding to the ODDNN 12*a* optimized for light of the first wavelength region.

Furthermore, for example, in a case where a bicycle on which a person rides is a target object, the sensor control unit 21 detects a bicycle on the basis of a signal input from the light receiving portion 13*c* corresponding to the ODDNN 12*c* optimized for light of the third wavelength region. In addition, the sensor control unit 21 detects a person on the basis of a signal input from the light receiving portion 13*a* corresponding to the ODDNN 12*a* optimized for light of the first wavelength region. Then, the sensor control unit 21 determines a bicycle on which a person rides, on the basis of the detected positional relation between the bicycle and the person.

In this manner, the neural network device 200 is able to detect a target object on the basis of the intensity distribution of the light emitted from the emission surfaces of the ODDNNs 12 optimized for mutually different wavelength regions. Here, in the neural network device 200, light of a wavelength region for which an ODDNN 12 is optimized is made to enter the ODDNN 12. Thus, it is possible to reduce crosstalk with light of other wavelength regions and improve the accuracy of target object detection.

The imaging control unit 22 causes the imaging element 14 to start imaging with detection of a predetermined target object (an automobile, for example) as a trigger.

Furthermore, the sensor control unit 21 detects and sets, as an ROI, a range in which the target object has been detected on the basis of the signal input from the light receiving portion 13 corresponding to the ODDNN 12 optimized for light mainly reflected by the target object. Then, the imaging control unit 22 causes the imaging element 14 to perform an imaging operation targeting only the ROI.

Thereafter, in a case where the target object is imaged by the imaging element 14, the imaging control unit 22 performs predetermined image analysis on the target object and calculates an ROI of the target object. Then, even at and after the next frame, the imaging control unit 22 performs image analysis on the captured image of the ROI calculated in the previous frame, performs target object recognition processing, and calculates an ROI for the recognized target object.

Note that the imaging processing in the third embodiment is the same as that in the first embodiment, and thus the description thereof will be omitted. Note that at step S2 and step S4, the target object or the ROI is detected on the basis of the signal input from the light receiving portion 13*a* corresponding to the ODDNN 12*a* optimized for the light of the wavelength region mainly reflected by the target object.

4. Fourth Embodiment

Figure 9:
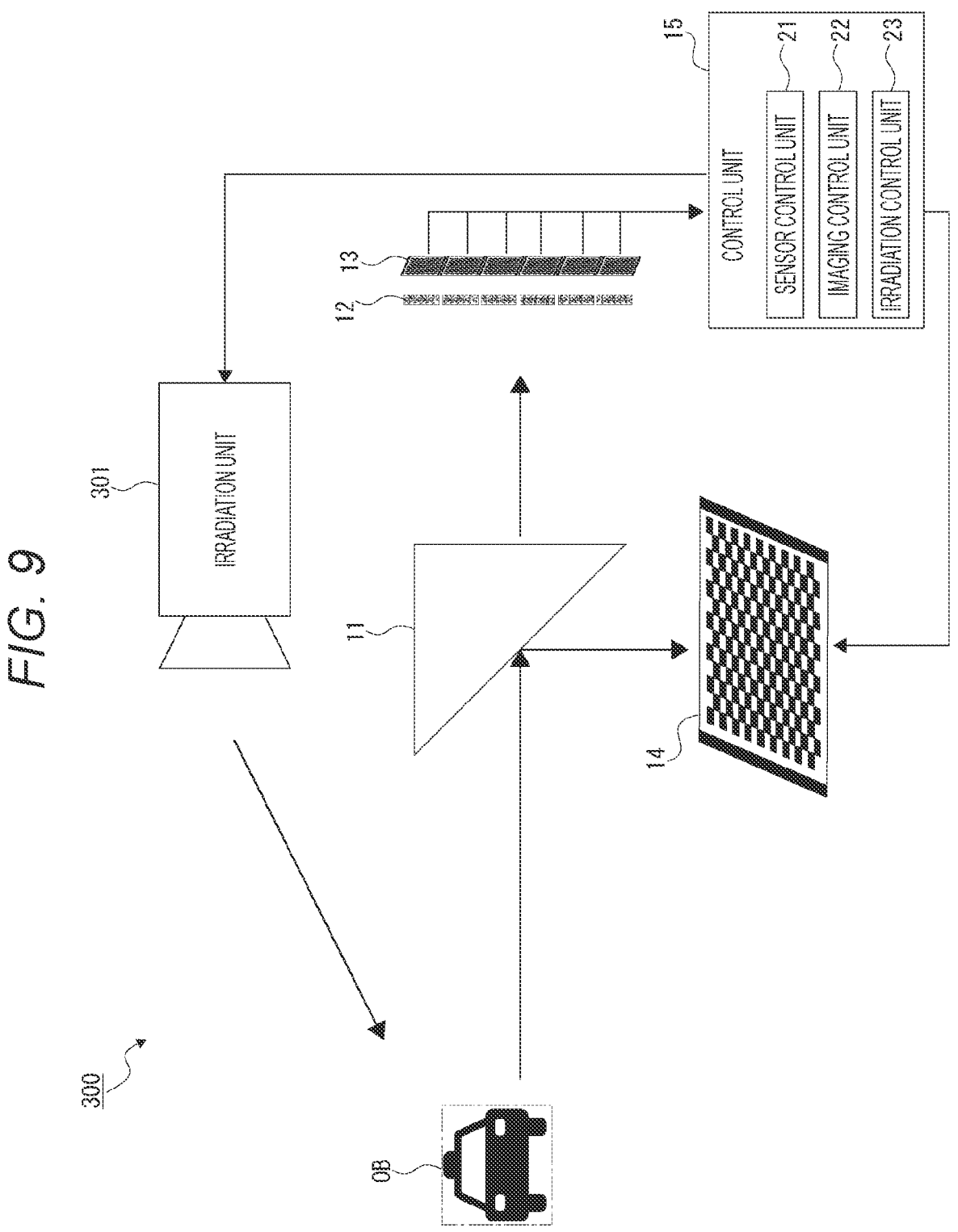
FIG. 9 is a diagram for explaining a configuration of a neural network device as a fourth embodiment.

FIG. 9 is a diagram for explaining a configuration of a neural network device 300 as a fourth embodiment. Note that in the fourth embodiment, configurations different from those of the first and third embodiments will be described in detail, and the same configurations are denoted by the same reference signs, and the description thereof is omitted.

As illustrated in FIG. 9, the neural network device 300 includes an irradiation unit 301, in addition to the half mirror 11, the ODDNN 12, the light receiving portion 13, the imaging element 14, and the control unit 15. In the fourth embodiment, the ODDNN 12 includes a plurality of ODD-NNs 12a to 12f each optimized for light of wavelength regions to be incident thereon, in a manner similar to the third embodiment. Furthermore, the light receiving portion 13 includes a plurality of light receiving portions 13a to 13f that receive light emitted from the emission surfaces of the ODDNNs 12a to 12f, respectively.

The irradiation unit 301 is driven on the basis of the control by the control unit 15, and is able to emit light of a predetermined wavelength region. Furthermore, the irradiation unit 301 is able to switch and emit light of different wavelength regions (or wavelengths). In addition, the irradiation unit 301 is able to simultaneously emit light of a plurality of wavelength regions such as visible light.

When the light emitted from the irradiation unit 301 is reflected by an object OB, the reflected light enters the half mirror 11. The half mirror 11 guides the transmitted light to the ODDNNs 12 and guides the reflected light to the imaging element 14.

The control unit 15 functions as a sensor control unit 21, an imaging control unit 22, and an irradiation control unit 23 in the fourth embodiment.

The irradiation control unit 23 causes the irradiation unit 301 to emit light of a predetermined wavelength region. The sensor control unit 21 detects a target object on the basis of a signal input from a light receiving portion 13 corresponding to an ODDNN 12 optimized for the wavelength region of the emitted light.

Figure 10:
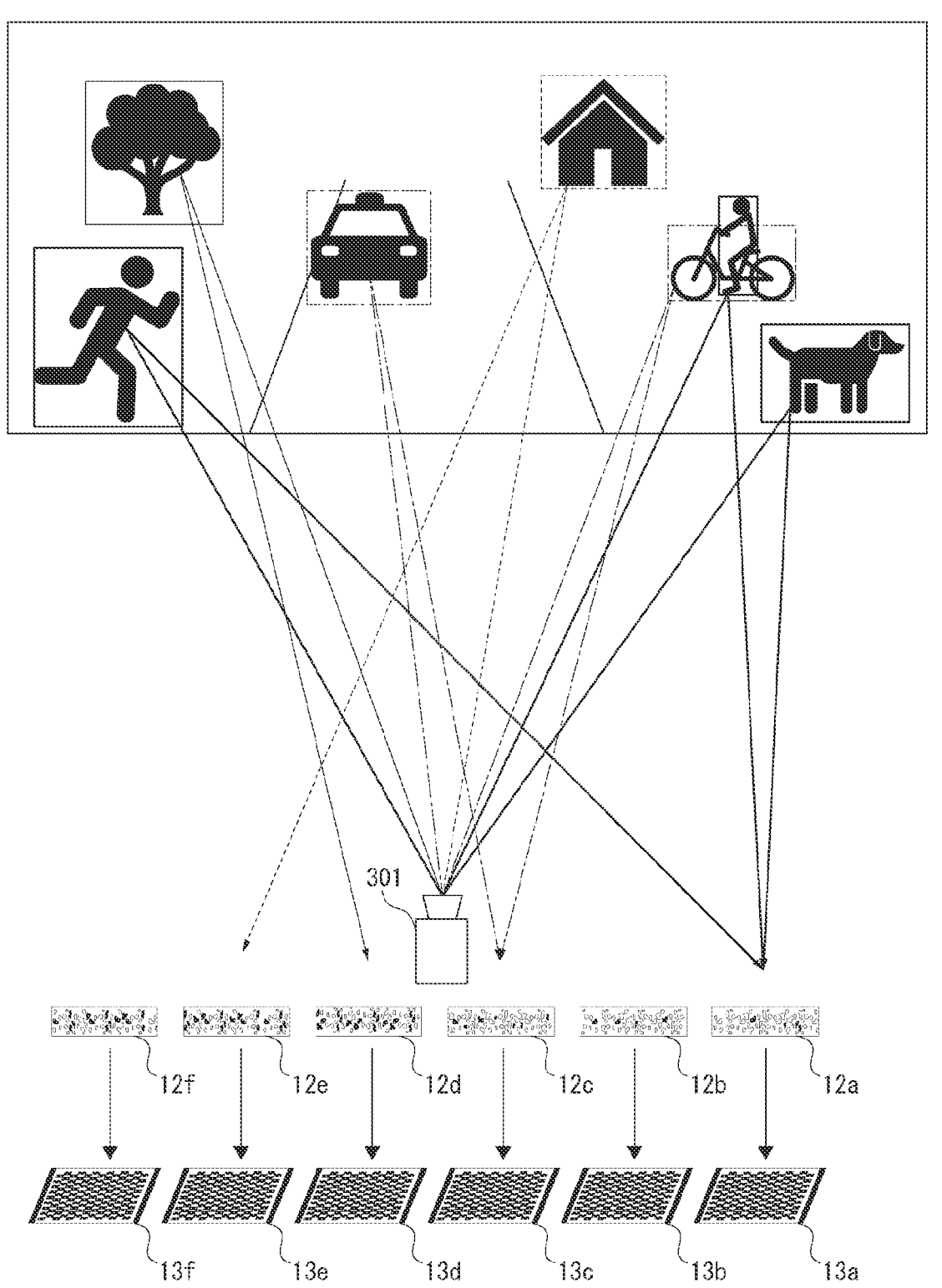
FIG. 10 is a diagram for explaining a specific example of target object detection.

FIG. 10 is a diagram for explaining a specific example of target object detection. Note that in the example illustrated in FIG. 10, the same target objects as those in FIG. 8 are set. As illustrated in FIG. 10, in a case where an automobile is a target object, for example, the irradiation control unit 23 causes the irradiation unit 301 to emit light of the third wavelength region, and the sensor control unit 21 detects an automobile on the basis of a signal detected by the light receiving portion 13c corresponding to the ODDNN 12c optimized for light of the third wavelength region. Here, the light receiving portions 13 corresponding to the ODDNNs 12 optimized for light of other than the third wavelength region may be stopped.

In a case where a bicycle on which a person rides is a target object, the irradiation control unit 23 causes the irradiation unit 301 to emit light of the third wavelength region, and the sensor control unit 21 detects a bicycle on the basis of a signal input from the light receiving portion 13c corresponding to the ODDNN 12c optimized for light of the third wavelength region. Furthermore, the irradiation control unit 23 performs switching to cause the irradiation unit 301 to emit light of the first wavelength region, and the sensor control unit 21 detects a person on the basis of a signal input from the light receiving portion 13a corresponding to the ODDNN 12a optimized for light of the first wavelength region. Here, the sensor control unit 21 determines a bicycle on which a person rides, on the basis of the detected positional relation between the bicycle and the person.

The imaging control unit 22 causes the imaging element 14 to start imaging with detection of the predetermined target object as a trigger.

Furthermore, the sensor control unit 21 detects and sets, as an ROI, a range in which a predetermined target object has been detected on the basis of a signal input from the light receiving portions 13. Then, the imaging control unit 22 causes the imaging element 14 to perform an imaging operation targeting only the ROI.

Thereafter, in a case where the target object is imaged by the imaging element 14, the imaging control unit 22 performs predetermined image analysis on the target object and calculates an ROI of the target object. Then, even at and after the next frame, the imaging control unit 22 performs image analysis on the captured image of the ROI calculated in the previous frame, performs target object recognition processing, and calculates an ROI for the recognized target object.

Figure 11:
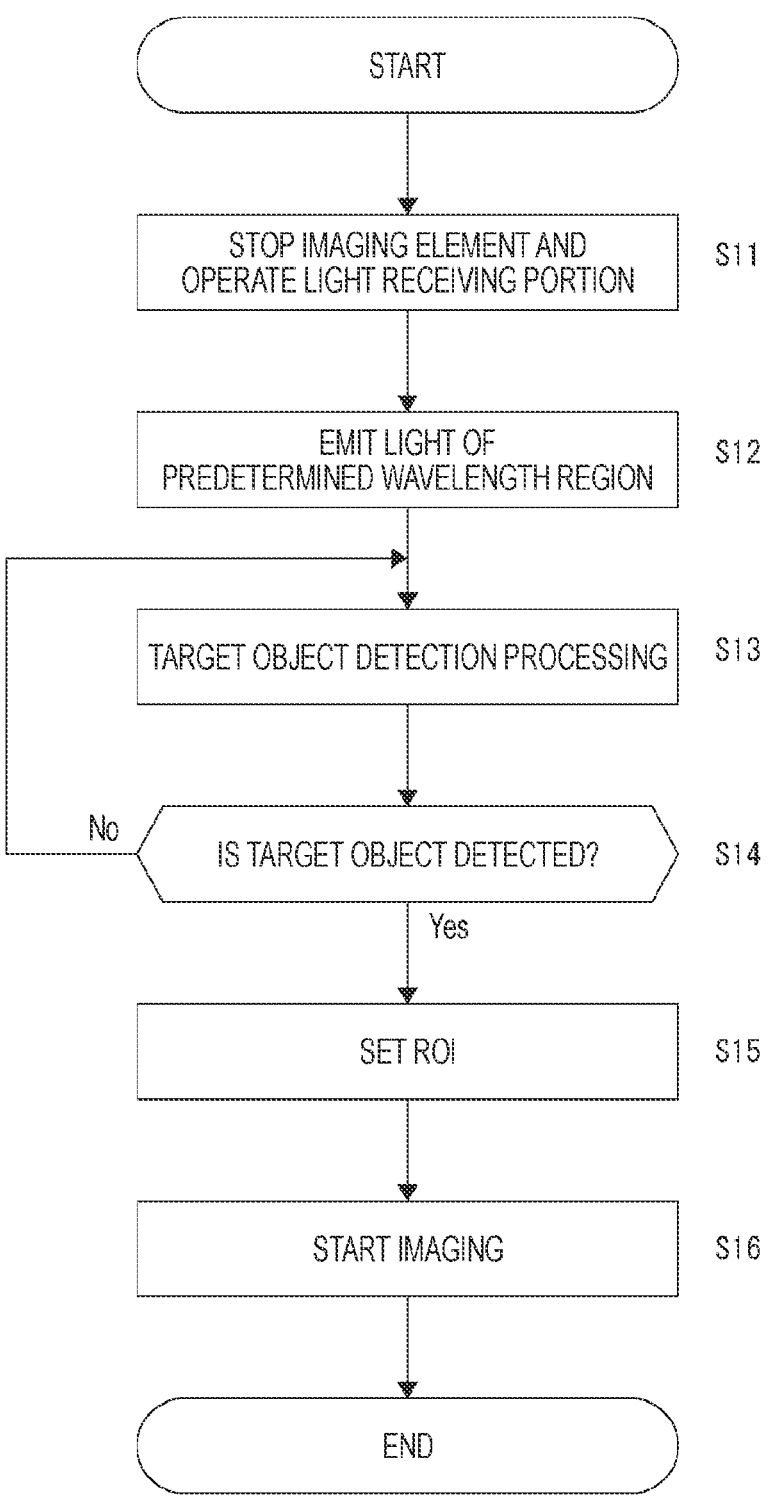
FIG. 11 is a flowchart showing a procedure of imaging processing.
Figure 12:
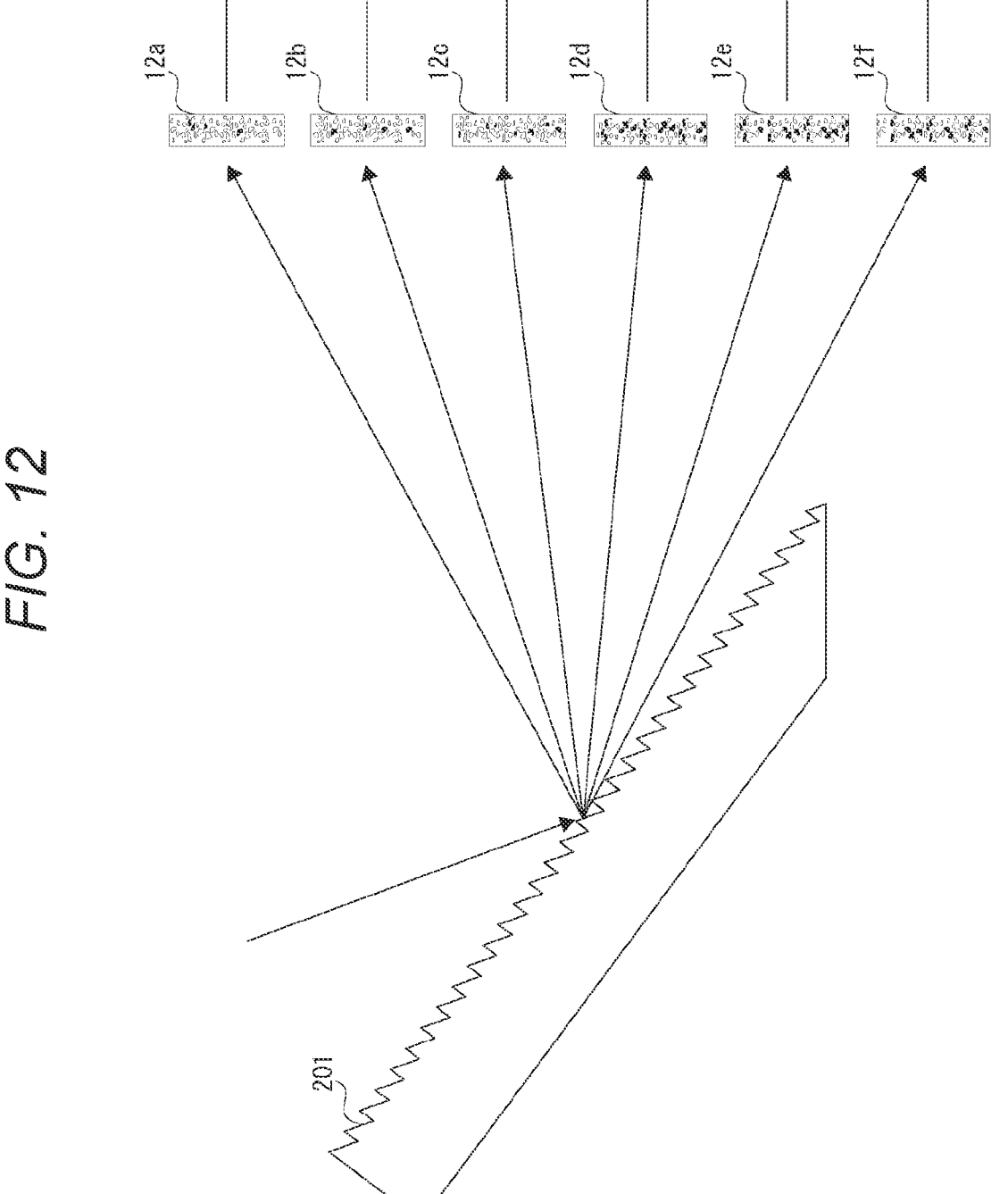
FIG. 12 is a diagram for explaining a spectroscopic portion according to a modification.

FIG. 11 is a flowchart showing a procedure of imaging processing. As illustrated in FIG. 11, at step S11, the imaging control unit 22 stops the imaging element 14, and the sensor control unit 21 starts operation of the light receiving portions 13.

Subsequently, at step S12, the irradiation control unit 23 causes the irradiation unit 301 to emit light of a wavelength region that is mainly reflected by a target object to be detected. Then, at step S13, the sensor control unit 21 performs target object detection processing of detecting a target object on the basis of a signal input from a light receiving portion 13 corresponding to an ODDNN 12 optimized for the light emitted from the irradiation unit 301.

Then, at step S14, the sensor control unit 21 determines whether a target object is detected at step S12. If the predetermined target object is not detected (No at step S14), the sensor control unit 21 repeats the processing of steps S13 and S14.

Meanwhile, if the predetermined target object is detected (Yes at step S14), at step S15, the sensor control unit 21 sets, as an ROI, a range in which the predetermined target object has been detected on the basis of the signal input from the light receiving portion 13.

Thereafter, at step S16, the imaging control unit 22 causes the imaging element 14 to start imaging targeting only the ROI set at step S14.

5. Other Configuration Examples of Neural Network Device

Note that the embodiments are not limited to the specific examples described above and may be configured as various modifications.

In the above-described embodiments, the imaging element 14 is caused to start imaging with detection of the target object based on a signal corresponding to light received by the light receiving portion 13 as a trigger. However, the neural network device may perform predetermined control other than imaging with detection of the target object based on a signal corresponding to light received by the light receiving portion 13 as a trigger.

In the above-described embodiments, the ROI is set on the basis of a signal corresponding to light received by the light receiving portion 13. However, imaging may be performed by the imaging element 14 without setting the ROI.

In the above-described third embodiment, the spectroscopic portion 201 that disperses light is provided as a light guide unit that guides light of an optimized wavelength region to the ODDNN 12. Furthermore, in the above-described fourth embodiment, the irradiation unit 301 that is able to emit light of a predetermined wavelength region is provided as a light guide unit that guides light of an optimized wavelength region to the ODDNN 12. However, the light guide unit may be other than the spectroscopic portion 201 and the irradiation unit 301 as long as the light of an optimized wavelength region can be guided to the ODDNN 12.

In the above-described third embodiment, a prism is applied as the spectroscopic portion 201. However, the spectroscopic portion 201 is not limited to a prism as long as light can be dispersed. For example, as illustrated in FIG.

12, the spectroscopic portion 201 may be a diffraction grating (grating) that disperses light.

In the above-described third and fourth embodiments, a plurality of ODDNNs 12 optimized for different wavelength regions is provided. However, only one ODDNN 12 optimized for any one of the wavelength regions may be provided. In this case, only one light receiving portion 13 may be provided.

Figure 13:
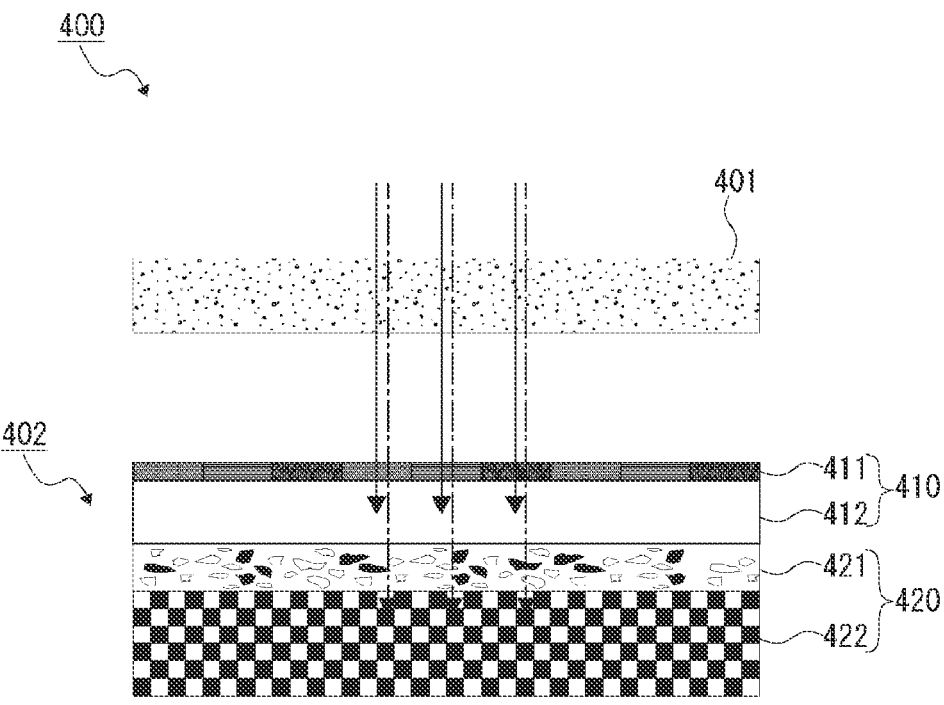
FIG. 13 is a diagram for explaining a configuration of an imaging detecting portion.

In the above-described embodiments, the light receiving portion 13 and the imaging element 14 are provided as separate bodies. However, the light receiving portion 13 and the imaging element 14 may be stacked. For example, as illustrated in FIG. 13, an imaging detecting portion 400 includes a dual-bandpass filter 401 and an imaging detection element 402. The dual-bandpass filter 401 is, for example, a filter that transmits visible light and infrared light and cuts light of other wavelength regions.

Light that has passed through the dual-bandpass filter 401 enters the imaging detection element 402. The imaging detection element 402 is packaged (integrated) with an imaging element part 410 and an ODDNN part 420 stacked on each other.

The imaging element part 410 includes, for example, color filters 411 arranged in a Bayer array and imaging elements (diodes) 412 corresponding to the color filters 411. Therefore, the imaging element part 410 is able to capture a full-color image on the basis of visible light out of visible light and infrared light having passed through the dual-bandpass filter 401. Furthermore, the imaging element part 410 transmits visible light out of visible light and infrared light having passed through the dual-bandpass filter 401.

The ODDNN part 420 includes an ODDNN 421 and a light receiving portion 422. The ODDNN 421 is optimized for infrared light, and is configured to be able to detect a target object on the basis of infrared light entering through the imaging element part 410. The light receiving portion 422 is arranged to face the emission surface of the ODDNN 421, and outputs a signal in accordance with the intensity of the light emitted from the emission surface of the ODDNN 421 to the control unit 15.

Such a configuration enables downsizing of the neural network device.

Furthermore, an artificial neural network (ANN) may be executed using light emitted from the emission surface of the ODDNN 12. Examples of the ANN include a known deep neural network (DNN), a convolutional neural network (CNN), a recurrent neural network (RNN), a spiking neural network (SNN), and the like.

Figure 14:
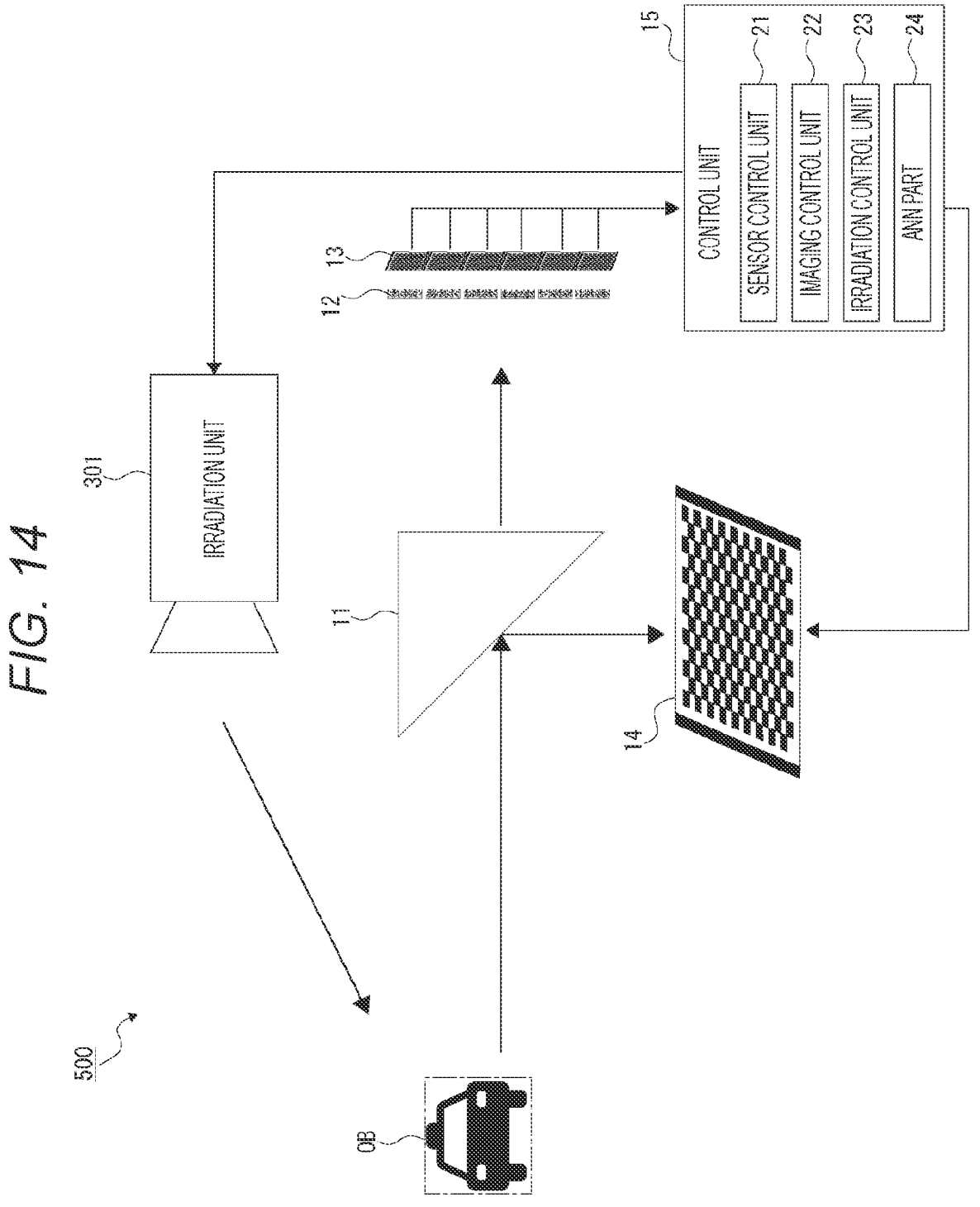
FIG. 14 is a diagram for explaining a configuration of a neural network device according to a modification.

For example, as illustrated in FIG. 14, a neural network device 500 includes the half mirror 11, the ODDNN 12, the light receiving portion 13, the imaging element 14, the control unit 15, and the irradiation unit 301, in a manner similar to the fourth embodiment.

The control unit 15 functions as a sensor control unit 21, an imaging control unit 22, an irradiation control unit 23, and an ANN part 24. The ANN part 24 executes an ANN on the basis of a signal input from the light receiving portion 13, that is, the intensity distribution of light emitted from the emission surface of the ODDNN 12.

The neural network device 500 having such a configuration first performs target object detection processing using the ODDNN 12, in a manner similar to the above-described embodiments. For example, in the target object detection processing using the ODDNN 12, a general target object is detected. Specifically, the sensor control unit 21 detects a vehicle including an automobile, a truck, a motorcycle, and a bicycle.

Then, the ANN part 24 executes the ANN on the basis of the intensity distribution of light emitted from the emission surface of the ODDNN 12 to detect a detailed target object. The ANN part 24 performs detection for distinguishing, for example, an automobile, a truck, a motorcycle, a bicycle, and the like.

Therefore, the neural network device 500 is able to reduce the processing load and the power consumption by the ANN and perform target object detection at high speed and with low consumption.

In the above-described embodiment, a case where the ODDNN 12 is used as the ONN. However, an OCNN may be used as the ONN. In a case where the OCNN is used, the composition (optical characteristics) of the OCNN may be configured to be changeable.

Figure 15:
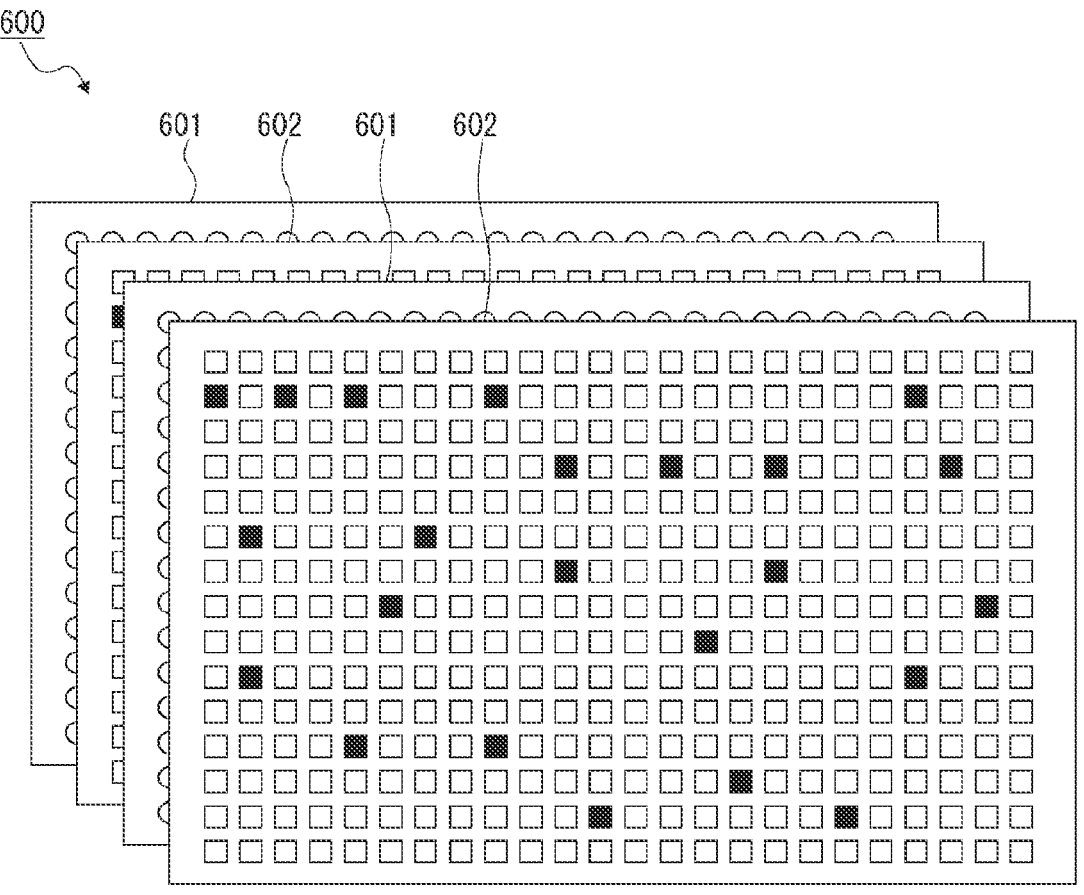
FIG. 15 is a diagram for explaining a configuration of an OCNN.

For example, as illustrated in FIG. 15, in an OCNN 600, two optical neural network layers 601 and two liquid crystal display (LCD) layers 602 are alternately arranged. Then, in the OCNN 600, the composition is changeable by the control unit 15 controlling the light transmittance of each pixel of the LCD layers 602.

Figure 16:
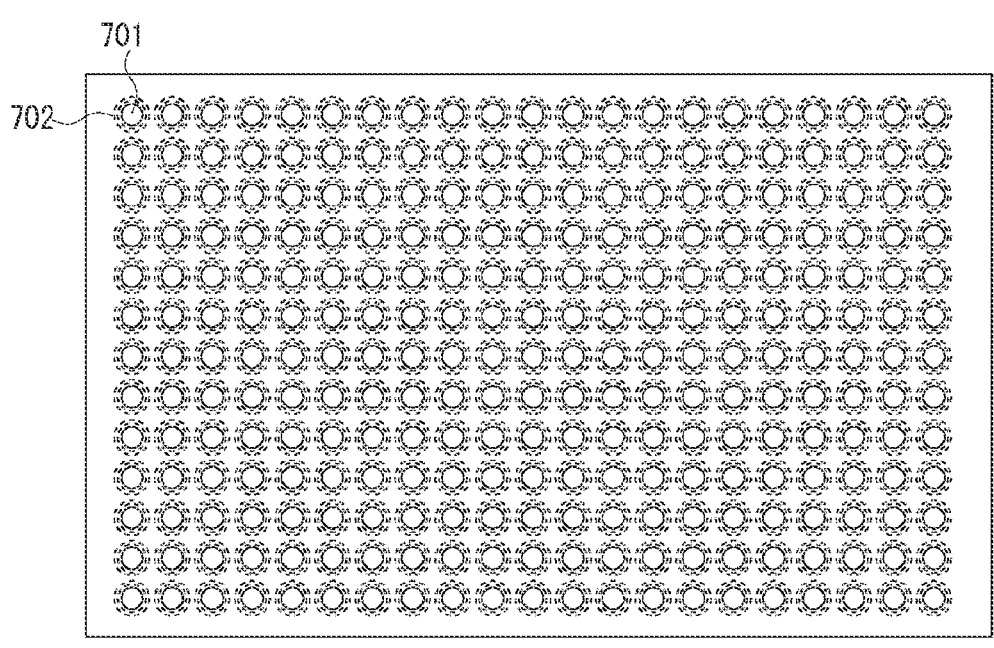
FIG. 16 is a diagram for explaining a configuration of an OCNN.

Furthermore, as illustrated in FIG. 16, in an OCNN 700, a plurality of metalens optical CNN neurons 701 is arranged, and a micro electro mechanical systems (MEMS) actuator 702 is provided on the outer periphery of each of the metalens optical CNN neurons 701. Then, in the OCNN 700, the control unit 15 controls the MEMS actuator 702, whereby the composition of the metalens optical CNN neuron 701 is changeable.

In this manner, with the OCNNs 600 and 700 allowing for composition change, it is possible to set optimum compositions for different wavelength regions without providing a plurality of ODDNNs 12, thus downsizing the device.

6. Summary of Embodiments

As described above, the neural network device (1, 100, 200, 300) according to the embodiments includes the light receiving portion 13 that receives light through the optical neural network (ODDNN 12), and the control unit 15 that performs a predetermined control with detection of a predetermined target object based on a signal corresponding to light received by the light receiving portion 13 as a trigger.

Therefore, before performing the predetermined control, the neural network device is able to operate the optical neural network operating with low energy and stop a device to be controlled.

As a result, the neural network device is able to start execution of the predetermined control with low power consumption.

Furthermore, the control unit 15 causes the imaging element 14 to start imaging with detection of a target object based on a signal corresponding to light received by the light receiving portion 13 as a trigger.

Therefore, the neural network device does not need to operate the imaging element 14 until a predetermined target object is detected, which achieves lower power consumption.

Furthermore, the control unit 15 sets, as a region of interest, a range in which a predetermined target object has been detected on the basis of a signal corresponding to light received by the light receiving portion 13.

Therefore, the neural network device is able to image a range where the target object is present.

Furthermore, the control unit 15 causes the imaging element to image the region of interest as an imaging range.

Therefore, the neural network device is able to image a range where the target object is present.

Furthermore, a plurality of optical neural networks (ODDNN 12, 102) is provided, and a predetermined target object is detected on the basis of a signal corresponding to light received by the light receiving portion 13 through any of the optical neural networks (ODDNN 102), and a region of interest is detected on the basis of a signal corresponding to light received by the light receiving portion through the other optical neural network (ODDNN 12).

Therefore, the neural network device is able to image a target object other than a target object to be a trigger.

Furthermore, the optical neural network is an optical diffractive deep neural network (ODDNN 12).

Therefore, in the neural network device, no power is consumed in the optical neural network, which achieves lower power consumption.

Furthermore, the optical neural network is an optical convolutional neural network (OCNN 600, 700) capable of changing optical characteristics.

Therefore, in the neural network device, it is possible to set optimum compositions for different wavelength regions without providing a plurality of ODDNNs 12, thus downsizing the device.

Furthermore, the neural network device includes the irradiation unit 301 that is able to emit light of a predetermined wavelength region.

Therefore, the neural network device is able to improve the accuracy of the wavelength region of light guided to the ODDNN 12, and improve the accuracy of target object detection.

Furthermore, the irradiation unit 301 is able to emit light of a plurality of wavelength regions, and the optical neural network is optimized for each of the plurality of wavelength regions that can be emitted by the irradiation unit 301.

Therefore, even in a case where a target object mainly reflecting a different wavelength region is present, the neural network device is able to accurately detect a target object using the ODDNN 12 corresponding to each wavelength region.

Furthermore, the optical neural network (ODDNN 12) is optimized for light of a wavelength region mainly reflected by a target object. The irradiation unit 301 emits light of a wavelength region mainly reflected by a target object to be detected, and the control unit 15 detects the target object on the basis of a signal input from the light receiving portion 13 that has received light emitted from the optical neural network optimized for the light of the wavelength region mainly reflected by the target object.

Furthermore, the neural network device includes the spectroscopic portion 201 that disperses light and guides the light to the optical neural network.

Therefore, the neural network device is able to guide the light of an optimized wavelength region to the ODDNN 12 with a simple configuration and without consuming power.

Furthermore, an imaging element (imaging element part 410) and an optical neural network (ODDNN part 420) may be stacked.

This achieves space saving and downsizing.

Furthermore, the imaging element (imaging element part 410) receives visible light, and the optical diffractive deep neural network (ODDNN part 420) receives infrared light having passed through the imaging element.

Therefore, it is possible to capture an image and detect a target object in different wavelength regions, which achieves space saving and downsizing.

In the above-described detection method according to the present technology, the control is performed with detection of a predetermined target object based on a signal corresponding to light received by the light receiving portion through the optical neural network as a trigger.

In the above-described program according to the present technology, the neural network device is caused to perform the control with detection of a predetermined target object based on a signal corresponding to light received by the light receiving portion through the optical neural network as a trigger.

Such a program may be recorded in advance in an HDD as a recording medium built in a device such as a computer device, a ROM in a microcomputer having a CPU, or the like.

Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, a memory card, or the like. Such a removable recording medium can be provided as what is called package software.

Furthermore, such a program may be installed from the removable recording medium into a personal computer or the like, or may be downloaded from a download site over a network such as a local area network (LAN), the Internet, or the like.

Furthermore, such a program is suitable for providing the neural network device according to the embodiments in a wide range. For example, downloading the program to a mobile terminal device such as a smartphone or a tablet, a mobile phone, a personal computer, a video game console, a video device, a personal digital assistant (PDA), or the like allows such a device to function as the neural network device of the present technology.

Note that the effects described in the present specification are merely examples and are not limited, and other effects may be provided.

7. Present Technology

The present technology may also adopt the following configurations.

(1)
A neural network device, including:
a light receiving portion that receives light through an optical neural network; and
a control unit that performs a predetermined control with detection of a predetermined target object based on a signal corresponding to light received by the light receiving portion as a trigger.

(2)
The neural network device according to (1), in which
the control unit
causes an imaging element to start imaging with detection of the target object based on a signal corresponding to light received by the light receiving portion as a trigger.

(3)
The neural network device according to (2), in which
the control unit sets, as a region of interest, a range in which a predetermined target object has been detected, on the basis of a signal corresponding to light received by the light receiving portion.

(4)
The neural network device according to (3), in which
the control unit

15 causes the imaging element to image the region of interest as an imaging range.

(5)

The neural network device according to (3) or (4), in which the optical neural network includes a plurality of optical neural networks, and a predetermined target object is detected on the basis of a signal corresponding to light received by the light receiving portion through any of the optical neural networks, and the region of interest is detected on the basis of a signal corresponding to light received by the light receiving portion through another optical neural network.

(6)

The neural network device according to any one of (1) to (5), in which the optical neural network is an optical diffractive deep neural network.

(7)

The neural network device according to any one of (1) to (5), in which the optical neural network is an optical convolutional neural network capable of changing optical characteristics.

(8)

The neural network device according to any one of (1) to (7), including an irradiation unit that is able to emit light of a predetermined wavelength region.

(9)

The neural network device according to (8), in which the irradiation unit is able to emit light of a plurality of wavelength regions, and the optical neural network is optimized for each of the plurality of wavelength regions that are able to be emitted by the irradiation unit.

(10)

The neural network device according to (9), in which the optical neural network is optimized for light of a wavelength region mainly reflected by the target object, the irradiation unit emits light of a wavelength region mainly reflected by a target object to be detected, and the control unit detects the target object on the basis of a signal input from the light receiving portion that has received light emitted from the optical neural network optimized for light of the wavelength region mainly reflected by the target object.

(11)

The neural network device according to any one of (1) to (7), including a spectroscopic portion that disperses light and guides the light to the optical neural network.

(12)

The neural network device according to any one of (2) to (11), in which the imaging element and the optical neural network are stacked.

(13)

The neural network device according to (12), in which the imaging element receives visible light, and the optical neural network receives infrared light having passed through the imaging element.

(14)

A control method, including performing control with detection of a predetermined target object based on a signal corresponding to light received by a light receiving portion through an optical neural network as a trigger.

(15)

A program causing a neural network device to perform processing of performing control with detection of a predetermined target object based on a signal corresponding to light received by a light receiving portion through an optical neural network as a trigger.

REFERENCE SIGNS LIST

1, 100, 200, 300 Neural network device
12 ODDNN
13 Light receiving portion
14 Imaging element
15 Control unit
201 Spectroscopic portion
301 Irradiation unit

The invention claimed is:

1. A neural network device, comprising:
a light receiving portion configured to:
receive first light through a first optical neural network of a plurality of optical neural networks; and
receive second light through a second optical neural network of the plurality of optical neural networks;
a control unit configured to:
detect a target object based on a first signal, wherein
the first signal corresponds to the received first light, and
the received first light corresponds to a trigger; and
detect a region of interest based on a second signal that corresponds to the second light.

2. The neural network device according to claim 1, further comprising an imaging element, wherein the control unit is further configured to control, based on the first signal, the imaging element to start an imaging process with the detection of the target object.

3. The neural network device according to claim 2, wherein the control unit is further configured to:
detect the target object in a specific range based on the first signal; and
set, as the region of interest, the specific range in which the target object is detected.

4. The neural network device according to claim 3, wherein the control unit is further configured to control the imaging element to image the region of interest as an imaging range.

5. The neural network device according to claim 1, wherein the first optical neural network is an optical diffractive deep neural network.

6. The neural network device according to claim 1, wherein
the first optical neural network is an optical convolutional neural network, and
the first optical neural network is associated with a plurality of variable of optical characteristics.

7. The neural network device according to claim 1, wherein the control unit is further configured to control an emission of third light of a specific wavelength region.

8. The neural network device according to claim 7, wherein the control unit is further configured to:
control the emission of the third light of a plurality of wavelength regions; and
optimize the first optical neural network for each of the plurality of wavelength regions.

9. The neural network device according to claim 8, wherein the control unit is further configured to:

optimize the first optical neural network for the third light of the specific wavelength region, wherein the target object reflects the emitted second light;

control the emission of the third light of the specific wavelength region, wherein the target object reflects the emitted third light; and detect the target object based on a third signal input from the light receiving portion, and the light receiving portion is further configured to receive the emitted third light emitted from the first optical neural network of the plurality of optical neural networks.

10. The neural network device according to claim 1, further comprising a glass prism configured to:

disperse light; and guide the light to the first optical neural network.

11. The neural network device according to claim 2, wherein the imaging element and the first optical neural network are stacked.

12. The neural network device according to claim 11, wherein the imaging element is further configured to receive visible light, and the first optical neural network is configured to receive infrared light that passed through the imaging element.

13. A control method, comprising in a neural network device:

receiving first light through a first optical neural network of a plurality of optical neural networks;

receiving second light through a second optical neural network of the plurality of optical neural networks;

detecting target object based on a first signal, wherein the first signal corresponds to the received first light, and the received first light corresponds to a trigger; and detecting a region of interest based on a second signal that corresponds to the second light.

14. A non-transitory computer-readable medium having stored thereon, computer-executable instructions which when executed by a neural network device, cause the neural network device to execute operations, the operations comprising:

receiving first light through a first optical neural network of a plurality of optical neural networks;

receiving second light through a second optical neural network of the plurality of optical neural networks;

detecting target object based on a first signal, wherein the first signal corresponds to the received first light, and the received first light corresponds to a trigger; and detecting a region of interest based on a second signal that corresponds to the second light.

\* \* \* \* \*